(12) United States Patent
Smithwick et al.

(10) Patent No.: US 9,712,810 B2
(45) Date of Patent: Jul. 18, 2017

(54) TRACKED AUTOMULTISCOPIC 3D TABLETOP DISPLAY

(71) Applicant: DISNEY ENTERPRISES, INC., Burbank, CA (US)

(72) Inventors: Quinn Y. Smithwick, Pasadena, CA (US); Christopher Stuart Gabriel, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 184 days.

(21) Appl. No.: 14/729,152

(22) Filed: Jun. 3, 2015

(65) Prior Publication Data

US 2016/0360187 A1    Dec. 8, 2016

(51) Int. Cl.
*H04N 13/04* (2006.01)
*H04N 9/47* (2006.01)
*G02B 27/22* (2006.01)
*G02B 27/00* (2006.01)
*G06T 19/00* (2011.01)
*G06T 19/20* (2011.01)

(52) U.S. Cl.
CPC ..... *H04N 13/0404* (2013.01); *G02B 27/0093* (2013.01); *G02B 27/2214* (2013.01); *G06T 19/006* (2013.01); *G06T 19/20* (2013.01); *H04N 13/0484* (2013.01)

(58) Field of Classification Search
CPC ................. H04N 13/0404; H04N 13/0409
See application file for complete search history.

(56) References Cited

U.S. PATENT DOCUMENTS

| 6,302,541 | B1 | 10/2001 | Grossmann |
| 6,965,381 | B2 * | 11/2005 | Kitamura ............. G02B 27/017 345/473 |
| 2005/0219240 | A1 * | 10/2005 | Vesely .................. G06F 3/0304 345/419 |

(Continued)

FOREIGN PATENT DOCUMENTS

EP    2615838 A1    7/2013

OTHER PUBLICATIONS

Smithwick, et al, "A Tracked Automultiscopic 3D Tabletop," Jun. 2015.
Yoshida S., "fVisiOn: glasses-free tabletop 3D display to provide virtual 3D media naturally alongside real media," Proc. SPIE 8384, Three-Dimensional Imaging, Visualization, and Display 2012, 838411 (2012).

(Continued)

*Primary Examiner* — Chikaodili E Anyikire
(74) *Attorney, Agent, or Firm* — Marsh Fischmann & Breyfogle LLP; Kent A. Lembke

(57) ABSTRACT

An apparatus for displaying three dimensional (3D) images to a viewer without the need for 3D glasses. The apparatus includes a display element with a lenticular display surface that is supported to be horizontal and face upward into a viewing space. The apparatus includes a location tracking element tracking a location of a viewer in the viewing space relative to the lenticular display surface. The apparatus includes a display controller generating reprojected content for operating the display element to display 3D images via the lenticular display surface. The reprojected content is generated by determining for each pixel of the display element the content or images passing through tracked and/or determined eye locations and then remapping content delivered to each of the pixels of the display element to achieve a predefined pattern of content in viewpoints of fixed camera positions for the display element.

24 Claims, 5 Drawing Sheets

(56) References Cited

U.S. PATENT DOCUMENTS

| | | | |
|---|---|---|---|
| 2008/0231926 A1* | 9/2008 | Klug | H04N 13/0425 |
| | | | 359/23 |
| 2011/0122130 A1* | 5/2011 | Vesely | G06T 15/20 |
| | | | 345/419 |
| 2012/0005624 A1* | 1/2012 | Vesely | G06F 3/012 |
| | | | 715/808 |
| 2012/0092339 A1* | 4/2012 | Pijlman | G02B 27/2214 |
| | | | 345/419 |
| 2012/0224038 A1* | 9/2012 | Roth | H04N 13/0418 |
| | | | 348/55 |
| 2013/0260360 A1* | 10/2013 | Baurmann | G06F 3/14 |
| | | | 434/365 |
| 2013/0300637 A1* | 11/2013 | Smits | G03B 35/18 |
| | | | 345/8 |

OTHER PUBLICATIONS

Takaki Y., Uchida S., "Table screen 360-degree three-dimensional display using a small array of high-speed projectors," Optics Express, vol. 20, Issue 8, pp. 8848-8861 (2012).

Klug, M., et al, "A Scalable, Collaborative, Interactive Light Field Display System," SID Symposium Digest of Technical Papers, vol. 44, Issue 1, pp. 412-415, (2013).

Kooima, R., et al, "A Multi-viewer Tiled Autostereoscopic Virtual Reality Display," VRST '10, Proceedings of the 17th ACM Symposium on Virtual Reality Software and Technology, pp. 171-174 (2010).

Tan Sle, "Stereo Geometry in OpenGL," http://www.orthostereo.com/geometryopengl.html, Apr. 21, 2015.

\* cited by examiner

TRACKED AUTOMULTISCOPIC 3D TABLETOP DISPLAY

BACKGROUND

1. Field of the Description

The present invention relates, in general, to devices and methods for providing a three-dimensional (3D) display in a glasses-free manner, and, more particularly, to a display system adapted for using a horizontally-oriented display (e.g., "a 3D tabletop display") to display high quality 3D images (left and right eye images) to one or more viewers' eyes that can be viewed without the need for the viewer to use special glasses, headgear, or filters (e.g., glasses-free 3D or autostereoscopy).

2. Relevant Background

Displays that provide the illusion of three dimensions have experienced a rebirth in the past few years. For example, a number of 3D televisions are now available for use in homes and home theaters. These 3D televisions generally operate by displaying a stream of left and right eye images in an alternating or time-multiplexed manner (e.g., left-right-left-right). Switching occurs so quickly that the viewer does not sense a flicker or change in the display. The viewer wears special headgear or glasses that operate in a synchronized manner with the display to only allow the light associated with the left eye image to reach the viewer's left eye and with the right eye image to reach the viewer's right eye.

While most commercial displays rely on the use of special glasses, it is generally agreed by those in the 3D entertainment industry that displays able to provide a 3D viewing experience without glasses or headgear offer significant advantages. Autostereoscopy is any method of displaying stereoscopic images (i.e., adding binocular perception of 3D depth) without the use of special glasses or headgear on the part of the viewer. Many autostereoscopic or glasses-free 3D displays have been developed using a variety of technologies including lenticular lenses on the display screen combined with interlaced content, screens configured as parallax barriers, volumetric displays, and holographic and light field displays. However, each display technology has to date been proven to have limitations that have limited their widespread adoption.

For example, 3D televisions have been configured as lenticular autostereoscopic displays. The 3D lenticular television is mounted vertically on a wall or on a support base, and a viewer has left and right eye images directed toward their eyes through a plurality of lenticules (or elongated lenses) that extend vertically upward or in a slanted manner upward on the outer surface of the display monitor. The 3D lenticular television may provide 1920 by 1200 pixels that are used to display an 8-view autostereoscopic image through the lenticules (or lens array or lenticular sheet). To this end, the image content (or digital image file) is inter-digitated or interlaced as a number of slices (e.g., 8 slices in this example) of images that include left and right eye images to provide the 3D effect, and the set of interlaced slices are displayed and repeated under each lenticule.

These 3D televisions have a number of drawbacks in practice. The viewer typically has to remain in a particular location relative to the front surface (lenticular sheet) of the display/monitor such as directly in front of the display/monitor and with their head (and left and right eyes) at a predefined height (e.g., a height matching the center of the display/monitor). The lenticular 3D television only provides views horizontally so if the viewer is at too great of a height (or too low of a height) the 3D image is viewed from an incorrect perspective, resulting in a distorted image that appears in an undesirable or unrealistic manner. The lenticular 3D television has a narrow field of view (fov), e.g., about 13 degrees, such that movement to the left or the right of the center position can result in confused (pseudoscopic) or repeated viewpoints, possibly ruining the 3D effect or correct perspective.

In either case, the interdigitated pixels or slices of the images are generated for views in a nominal view zone (e.g., assuming a viewer is located centrally in front of the display). However, due to inherent lens cross-talk, views are repeated at each of a number of additional view zones to the left and right of the nominal view zone (e.g., repeated view zones). In the example of an 8-view autostereoscopic image, eight pixels or slices are interlaced in a particular pattern (View image 0, View image 1 . . . View image 7), and this pattern is presented in each view zone. The interdigitated image sets (or sets of pixels or image slices) are chosen with the assumption that the view images are captured at a fixed distance and spacing from the front surface or lenticular sheet such as about 13 feet away. If the cameras are moved closer to the front surface or too far to the side to coincide with the viewer's viewpoints, the quality of the 3D image may quickly be unacceptable. For example, if a viewer is located such that their right eye is in the nominal view zone but their left eye is in a repeated zone, the eyes' view order will be incorrect and the viewer will perceive a pseudoscopic image with incorrect 3D cues and confused imagery. Similarly, if the eight camera's view images are captured from locations away from the nominal view distance (such as to render from a tracked viewer's eye points) but otherwise interlaced as before, the viewer's angle of convergence of the display will be incorrect leading to depth distortion. Typically, the camera separation (the stereo base line) and field of view must be adjusted to correct the depth distortion. However, this likely means that cameras will not be at the two viewer's eye points (so, incorrect perceptive), and the display will not allow for smooth parallax as camera viewpoints are constrained and will not account for repeated or straddled view zones. As a result, even with the use of tracking devices to compensate for perspective distortion in the render view images, lenticular 3D televisions (horizontally or vertically-mounted 3D displays) are limited in their effectiveness in displaying 3D imagery to a viewer that changes their height, viewing position, or changes their proximity to the display or their viewing distance.

SUMMARY

The inventors determined that there was a need for 3D displays that can be oriented horizontally, as in a tabletop, rather than just vertically, as in a portrait display. Vertically oriented 3D displays, such as lenticular 3D televisions/displays, are useful for presenting a 3D object to a viewer, but the object appears to "float" in space and has no connection to the ground or surrounding environment, and the perspective remains on-axis and does not appreciably change in appearance with changes in viewing distance. In contrast, a horizontal 3D display or 3D tabletop display would be desirable if it could display a 3D object or image that appeared to be supported and cast (virtual) shadows upon the display's upper (and outer) surface. Furthermore, as the viewer gets closer or further from the 3D tabletop, the perspective of the object may change significantly from an overhead view to an off-axis view.

In this regard, tabletop or sandbox displays allow a viewer to easily examine the object from very different angles by simply and naturally moving left-right or closer-further away from the table. Similarly, 3D tabletop displays can present 3D objects that appear to be placed on the table, extending a distance above the table top, with an added sense of weight and solidity. The ability for each viewer or user to see a different viewpoint of the synthetic object (displayed 3D image) or for a single user to see multiple viewpoints of the 3D object further adds to the sense of presence of the 3D object. Further, autostereoscopic 3D tabletops (or sandbox displays) are considered the ultimate implementation as a user may naturally view the 3D objects apparently on the tabletop without the encumbrances of 3D glasses, and the inventors teach several embodiments of such autostereoscopic 3D tabletop displays (or automultiscopic 3D tabletop displays or simply "3D tabletop displays" or "3D tabletops") in the following description.

More particularly, an apparatus is provided for displaying three dimensional (3D) images to a viewer without the need for 3D glasses. The apparatus includes a display element with a lenticular display surface, and, in many applications, the lenticular display surface is supported to be horizontal and face upward into a viewing space. The apparatus also includes a location tracking element tracking a location of a viewer in the viewing space relative to the lenticular display surface. The apparatus also includes a display controller generating reprojected content for use in operating the display element to display 3D images to the viewer via the lenticular display surface. To this end, the reprojected content is generated from a digital 3D scene and is based on a set of eye locations determined based on the location of the viewer in the viewing space.

In some cases, the apparatus includes an interdigitation module processing the reprojected content to generate interdigitated content for the lenticular display surface that is used in the operating of the display element to display the 3D images to the viewer. In the same or other cases, the set of eye locations includes at least four eye locations including at least a left eye location and a right eye location associated with positions of eyes of the viewer in the viewing space (e.g., locations to allow for errors in location tracking of the viewer's eyes and to account for latency in tracking/reprojection processes).

In practice, the reprojected content can be generated by rendering perspective correct imagery from each tracked eye location, then using reprojection to determine which portions of each displayed image would be captured by which image portions of the eight spaced apart virtual cameras at the nominal viewing distance, and then interdigitating the eight camera images for presentation on the lenticular display. The remapping may include reprojecting content between viewpoints of the nominal view zone and the pixels of the display element through each of the eye locations. Further, the nominal view zone can be at a distance in the range of 9 to 13 feet from the lenticular display surface while the eye locations are at a viewing distance less than the distance of the nominal view zone (e.g., design distances may be 9 feet while the viewer may be much closer such as in the range of 3 to 4 feet from the display surface or "tabletop"). In some cases, the display controller performs the generating on a periodic basis with a frequency of 30 times per second or greater.

The apparatus may be adapted for use by two viewers. In such cases, the apparatus may include a second location tracking element tracking a location of a second viewer in a second viewing space on a side of the lenticular display surface opposite the viewing space. The apparatus may also include a backlight assembly operating to provide first and second directional backlighting to the display element in a time multiplexed manner. The first backlighting can be projected through the lenticular display surface to the viewing space (or first viewing space), and the second backlight can be projected through the lenticular display surface to the second viewing space. Further, the display controller generates second reprojected content for use in operating the display element to display 3D images to the second viewer via the lenticular display surface. The second reprojected content is generated from the digital 3D scene and is based on a set of eye locations determined based on the location of the second viewer in the second viewing space. The backlight assembly may include directional lighting selectively providing the first and second backlighting through the lenticular display surface with angular offsets of at least 30 degrees (e.g., in the range of 30 to 90 degrees offset between the directional lighting provided into each viewing space).

DETAILED DESCRIPTION

Figure 1:
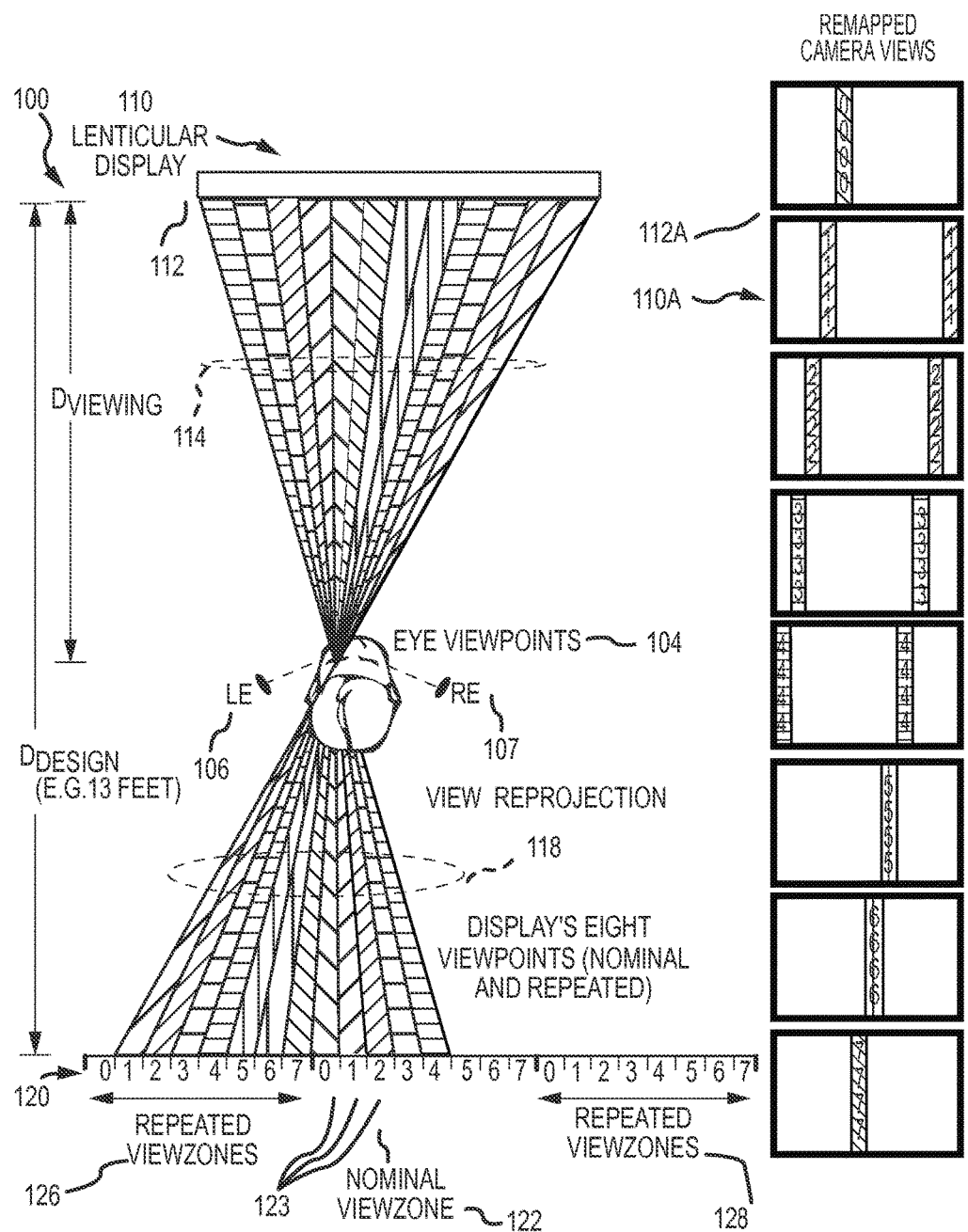
FIG. 1 illustrates a schematic and/or functional diagram of a 3D display system of the present description.

Briefly, a tracked automultiscopic 3D tabletop display (or, more simply, a 3D tabletop display) is described that allows a viewer or user to view a 3D image or object on, above, below and/or straddling an upper, outer surface of the 3D tabletop display while the user is free to move relative to the upper, outer surface within a viewing space. It was desired to provide a large, wide field-of-view (fov) 3D tabletop display that does not require the viewers to don 3D glasses, and the inventors investigated an autostereoscopic extension of anamorphic projection. As part of this investigation and experimentation, a 42-inch autostereoscopic tabletop display was created using a commercially-available lenticular 3D display with viewer tracking that was modified so as to provide multiscopic viewpoint reprojection. The use of this reprojection process overcame the lenticular 3D display's inherent limitations including horizontal-parallax only perspectives, limited fov, and repeated view zones. With the new 3D tabletop display, a single viewer can observe full-parallax synthetic 3D objects on the upper, outer surface of the large tabletop monitor/display element over a wide field of view (e.g., a fov of up to about 120 degrees rather than only a fov of 13 degrees as provided by many lenticular 3D televisions or vertical displays), without the need for 3D glasses.

The inventors recognized that trompe-l'oeil and anamorphic projection are often used to present perspectively correct two dimensional (2D) imagery, which gives the visual appearance of 3D objects that extend above or below a horizontal 2D image plane. The illusion is only sustained for one specific viewpoint at which the perspective is correct and breaks down for changing viewpoints or normal stereo viewing. Tracking the viewer's vantage point and updating the perspective projection can be used to maintain the illusion of changing viewpoints and provides additional motion parallax 3D cues. However, the lack of stereo cues causes the illusion to break down again when motion stops. Stereoscopic anamorphic projection that could be combined with tracking was investigated, but this was not as desirable as the described 3D tabletops because 3D glasses are still required.

The inventors also were aware that others had performed research into autostereo tabletops, but this research centered on creating a large number of views distributed over 360 degrees. For example, one 360-degree autostereo tabletop used 100 tiny projectors and a handmade optical diffuser cone to create 5 centimeter tall virtual characters. Other tabletop displays used rapidly spinning anisotropic diffusers and multiple high-speed binary projectors to create 30 centimeter diameter, 800 angular parallax-only views at 24 Hertz. Still others have created a scalable full-parallax light field tabletop using tileable lenslet arrays, tapered fiber bundles, and organic light emitting diode (OLED) microdisplays that provide a display volume of 35 centimeters by 41 centimeters by 26 centimeters and a 3 to 12 Hertz refresh rate for a nine tile prototype. While these displays are useful in providing 3D imagery, each system utilized hardware and rending algorithms that are demanding, especially considering many displayed views are simply not seen or viewed by the viewer. Scaling these displays is expensive and difficult due, in part, to the use of rapidly moving parts and/or a large number of components.

In the design and prototyping process, a 3D or autostereoscopic tabletop display was created using an 8-view lenticular-based auto-multiscopic display laid flat (or with its display screen/surface horizontal instead of vertical). Each of the eight views was made up of anamorphic renderings of a 3D scene from slightly different perspectives projected onto the flat tabletop (or flat display screen or outer, upper surface of the display element). The multiple view images are interdigitated (or interlaced) such that corresponding (sub)pixels in the different views are grouped under a common lenticule of the lens array or lenticular sheet. In this way, the view images are viewable from different directions depending upon their (sub)pixels' relative location under the lenticule.

It was understood that one cannot passively render a 3D scene from multiple viewpoints, interdigitate the images, and present them on the lenticular display with an expectation that the viewer will be able to freely view the synthetic object from any angle. Because conventional lenticular-based auto-multiscopic displays only present multiple views in one direction (i.e., the displays are horizontal parallax only (or orthogonal or transverse to longitudinal axes of the lenticules)), the perspectives of the 3D images are only correct for viewpoints along a horizontal line at a given viewing distance and height. Furthermore, conventional lenticular displays only offer a small field-of-view or fov (e.g., about 13.3 degrees) before the viewer observes a pseudoscopic zone and then repeated views. Thus, confused or incorrect perspective views are presented for moderate off-axis viewpoints.

The conventional lenticular display also expects its content to be rendered from a specific number of views (e.g., eight views). Traditionally, the views are rendered using horizontal orthographic projection (viewer at infinity); however, many modern lenticular displays are designed so the views are perspectively rendered at defined locations a fixed distance (e.g., 13 feet) away. However, in either case, the viewer is able to view the tabletop display from any location, such as an arm's length away (e.g., 3 to 4 feet) instead of the conventional fixed viewing distance (of 9 to 13 feet), and these "too close" viewing distances would result in incorrect perspective and low quality or confused 3D images if a conventional lenticular display was simply laid flat or horizontal without further modification (or changes to its control and/or input content).

In the 3D tabletop displays taught herein, user tracking and multiscopic viewpoint reprojection are used to present consistent 3D images. Briefly, the control method for the 3D tabletop display includes remapping the viewer's stereo free viewpoint images into the display's fixed eight views at the specific locations, accounting for and taking advantage of the repeated view zones provided by the lenticular sheet. The eight display views are then appropriately interdigitated for presentation on the lenticular 3D tabletop display. This procedure and algorithm allows correct perspective 3D stereo free-viewpoint images over a wide field-of-view (fov) without pseudoscopic imagery. The inventors also have determined how to better provide content so as to maximize the depth presentation of the autostereoscopic tabletop display.

For image capture from cameras at distances other than the nominal 13 feet, others have modified the separation of the camera viewpoints and their fields of view to maintain proper depth perception, proper viewer's angle of convergence, and proper 3D object size on the display plane. However, viewpoints are still fixed and not necessarily at the viewpoint of the observer (resulting in discrete changes in perspective horizontally, and not change in perspective vertically). Also, this does not account for pseudoscopic and repeated view zones at larger viewing angles. Prior research on rendering tracked free-viewpoint autostereoscopic images from a lenticular display has been done for a tiled autostereoscopic display wall. The best results in this prior research were achieved by view-reassignment where tracked viewer eye positions are quantized to the two nearest lenticular view's center points, and the eight view images are rendered with the viewer's two views in the middle of the set.

In contrast, however, the inventors observed that at locations away from the nominal display viewing distance (e.g., nine feet) eye views are composed of several display views. Display views appear as several strips/slices varying with viewing angle and also with viewing distance. This can be seen with reference to FIG. 1 which illustrates schematically a 3D tabletop display 100 of the present description (shown projecting downward but it will be understood the display 100 typically will project/display upward toward a viewer). The 3D tabletop display 100 includes a lenticular display element/device 110 that includes an outer (typically upper) surface 112 upon which a plurality of parallel, side-by-side, and possibly skewed lenticules or a lenticular sheet (or lens array) is provided. When operated, the display element 110 outputs light 114 based on interlaced or interdigitated content from a number of images (e.g., 8 images in this example) with a like number of slices or strips provided under each lenticule of the display surface 112.

A viewer is located a viewing distance, $D_{Viewing}$, away from the display surface 112 that may differ from (e.g., be less than) the nominal or design viewing distance, $D_{Design}$, for the display element 110. For example, the viewer may be standing 3 to 4 feet above the tabletop or surface 112 rather than 13 feet away (or other design/nominal distance). The viewpoint or viewing location 104 (and viewing angle which may not be 90 degrees from the horizontal surface 112) results in the viewer's eyes 106 and 107 receiving a first set (or pair) of the interlaced stripes from light 114 rather than those reaching the display's design viewpoints 120 as shown with rays/light 118. The design viewpoints 120 are made up of, in this non-limiting example, eight viewpoints 123 provided in a nominal view zone/location (center location) 122 and in sets of repeated view zones 126 and 128 (to the left and right of the nominal or center view zone 122).

Without modification, each of the multitude of strips for a display view originate from a different view zone 122, 126, 128. From these observations, the inventors determined that the viewer's two eye viewpoints 106, 107 at an arbitrary distance, $D_{Viewing}$, and location (x, y, z position) should be remapped or reprojected into the display's set of viewpoints (here 8 viewpoints 123 as shown for nominal view zone 122) at their assumed fixed locations and distance (e.g., in the set of view zones or viewing plane 120 at the nominal or design viewing distance, $D_{Design}$). In FIG. 1, the 3D display element 110A is intended to indicate that the content has been reprojected or remapped into the eight camera views so when interdigitated the display surface 112A provides perspectively correct autostereo imagery to the viewer's eyes 106, 107.

Figure 2:
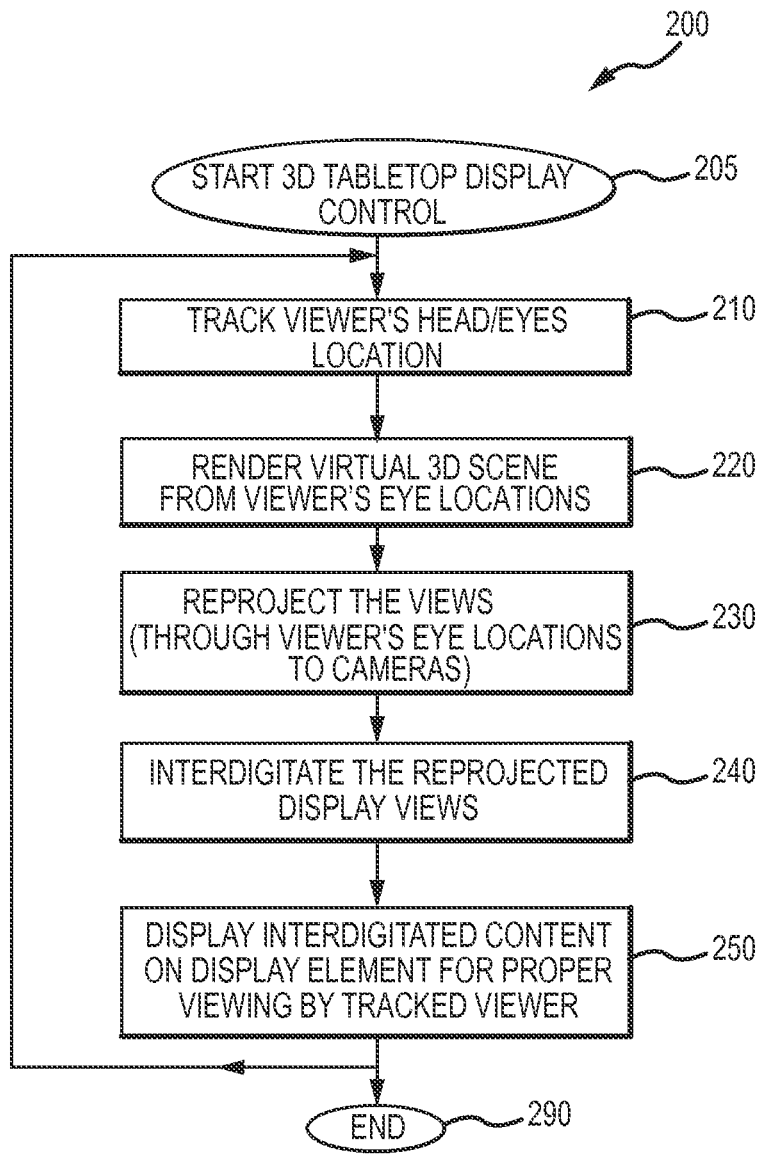
FIG. 2 illustrates a flow diagram of a control method for use in controlling/operating a 3D display element to more effectively display 3D content to a viewer that may move relative to the horizontally oriented lenticular display surface.

FIG. 2 illustrates a method 200 for controlling a lenticular-based 3D tabletop display, such as display 100 of FIG. 1, to address these issues including the viewer that is moving to differing viewing distances and viewing angles relative to the tabletop. The method 200 may also be thought of as a content creation method for a 3D tabletop. The method 200 starts at 205 such as with modifying a conventional lenticular 3D display, if needed, to have a horizontal configuration (e.g., with the outer display surface/screen facing upward) and to include one or more viewer tracking devices for sensing and/or determining the location of the viewer's head (and, more preferably, the viewer's left and right eyes). Step 205 may also include providing software and/or hardware for performing the later steps of the method 200 such as for rendering images and reprojecting/remapping viewpoints to generate new content to be interlaced or interdigitated.

The method 200 continues at 210 with the location tracking device(s) operating to determine the viewer's current head (and, in some cases, eye) location relative to the tabletop (or upper display surface), e.g., the viewer's head may be in the range of 0 to 6 feet or more from the tabletop and at a particular viewpoint or angle (e.g., from a line extending vertically outward from the center of the display surface). With this location data, the method 200 continues at 220 with rendering the virtual scene from at least two viewpoints an eye width apart and centered around the tracked user's head location, e.g., centered at an estimated location between the viewer's left and right eyes at the presently tracked head location. While two viewpoints are adequate in some cases, it may be useful in other implementations at 220 to render the scene from additional viewpoints proximate to the original left and right eye locations such as at third and fourth locations on either side of the original left and right eye locations. In this way, four (or more) viewpoints can be used to render the scene at the current head position and can be used to provide pre-rendering or predictive rendering for future movement of the viewer's head, as well as to add robustness to tracking and reprojection errors.

In step 220, virtual cameras are used by the rendering module (or rendering software) to render the scene from the two or more viewpoints. The virtual cameras may be configured in a number of ways to practice the method 200. However, it may be particularly useful to configure the virtual cameras to use parallel axis asymmetric frustrums. Further, these frustrums may be adapted to have viewing axes that are parallel with the tabletop's normal and to have planes of zero disparity/parallax that are coplanar with the tabletop plane.

Next, the method 200 continues at 230 with reprojecting the views (left and right eye views with or without additional views) generated or rendered in step 220 to the appropriate display's fixed camera views (e.g., the display's views shown in the set of view zones 120 in FIG. 1 for lenticular display element 110). To this end, a reprojection module (or reprojection/remapping software) may perform this reprojecting based on the width of the display surface, the currently tracked distance from the viewer to the display (or viewing distance), and the distance from the display surface to the lenticular display element's camera positions (predetermined and stored in system memory and may correspond with the view zones 122, 126, 128 for a lenticular display element 110 as shown in FIG. 1 as the cameras may be placed in the view zones).

By processing these inputs, the reprojection module determines the display's fixed camera baseline. This baseline typically will be larger than the nominal baseline assumed by the display and includes view zone repeats. In step 230, the fixed camera baseline is divided into the number of separate display viewpoints based upon the standard eye separation of 2.5 centimeters. The reprojecting of step 230 also includes determining the number of view zone repeats based upon the number of display views per view zone (e.g., eight display views per view zone in the example of FIG. 1).

Next, for performing step 230, for each display view, the reprojection module acts to cycle through all the eye views' rendered pixels (pixels, columns, or slices/stripes to be displayed on the screen) and reproject them (e.g., horizontally) through their corresponding tracked eye (or eyepoint) to the camera baseline (with its numerous viewpoints). If a pixel is reprojected back to the display view's corresponding camera, the viewer pixel is transferred to that display view's image. The view reprojection and remapping is done analytically in some preferred embodiments (while other embodiments may use ray tracing) and can be accomplished in real time (or near real time). In some cases, the reprojection is performed by a graphics processing unit (GPU) fragment shader (e.g., the reprojection module may include or use a GPU fragment shader).

For example, FIG. 1 illustrates the view zone 122 as having pixels 123 in the order 0, 1, 2, 3, 4, 5, 6, and 7 from left to right. This may be useful when the viewer's eyes are at a predefined or expected viewing distance and viewing angle such as 18 feet and in nominal view zones in the center front of the display surface. However, if the viewer's tracked location is only 3 feet above and away from the display surface and/or the viewer is positioned off center by some angle such as at 45 degrees relative to the center line/plane, the viewer's eyes may receive a combination of different images than intended by this set and repeated pattern. Step 230 acts to determine which pixels (or columns/slices/stripes) the viewer may receive at this tracked location at two or more eye positions and then to reorder them to what is displayed to achieve the imagery intended with the original baseline pattern. For example, it may be desired that the viewer's left eye receive an image rendered from its perspective at a particular display time, but, due to the location of the viewer's eye it may be determined that it is receiving not a single image from one view zone but a combination of Views 0 to 7. Remapping and reprojection can be used to provide the perspectively correct content via a combination of Views 0 to 7. This may result in the desired perspective image being divided into a pattern differing from the original or default or nominal image/pixel order. The key aspect being that the method 200 involves determining two to four eye positions at a currently viewing time and viewer's tracked location and then determining which pixels/columns/slices under each lenticule (by working through each and every pixel, column, or stripe/slice being displayed under each lenticule) are actually being received at the current eye locations. Then, a reordering or remapping is performed of the pixels in the set of view zones at the design depth or camera locations (shown as the set of view zones or camera locations 120 in FIG. 1) to provide a display order for the lenticular display element.

The method 200 continues at 240 with appropriately interdigitating or interlacing each of these display views (or pixels or image slices/stripes) for presentation on the lenticular display element. Interdigitation may be performed using a fragment shader (such as that provided by Alioscopy or other providers of glasses-free 3D displays making use of lenticular technology), which may be designed for use with slanted or skewed lenticular sheets and, in some cases, using eight rendered display viewpoints. The method 200 then continues at 250 with the interdigitated content being displayed to the viewer at their presently tracked location (viewing distance and location) via the lenticular sheet (e.g., with proper interlacing underneath each orthogonal or slanted lenticule). The method 200 then may end at 290 or continue at 210 with tracking of the viewer's new location and providing new 3D renderings changed due to the tracked locations for a new display with new reprojection and interdigitating via repeating of steps 220 through 250.

Figure 3:
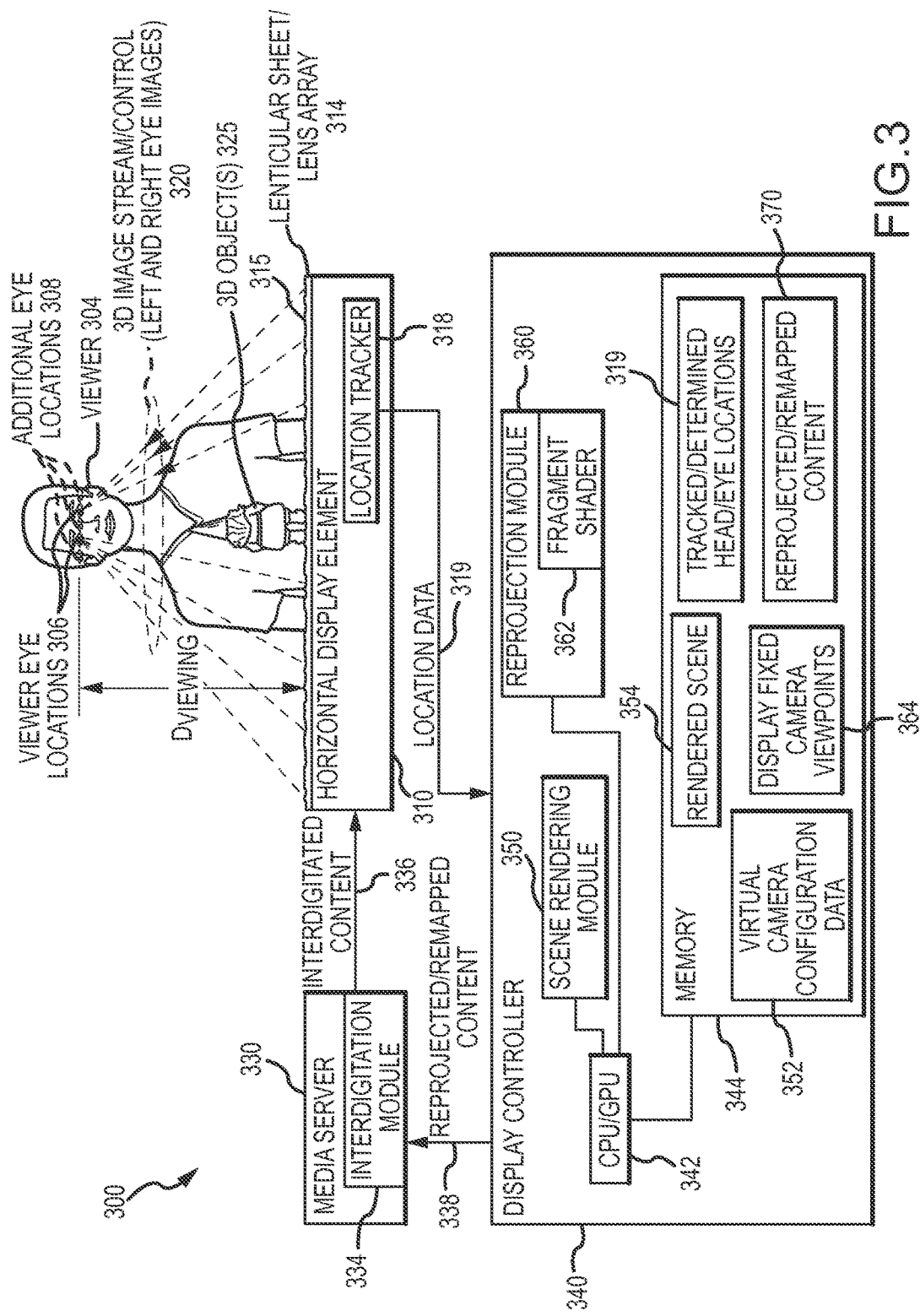
FIG. 3 is a functional block diagram of a 3D display system of the present description.

FIG. 3 illustrates a functional block diagram of a 3D display system 300 that may be used to display 3D content from a horizontal surface such as by implementing the control method 200 of FIG. 2. As shown, the system 300 includes a display element 310 that is oriented to be horizontal (e.g., to be viewed from above) so as to provide a tabletop display. The display element 310 uses lenticular technology to provide 3D displays, and, with this in mind, a lenticular sheet or array of lenticules (orthogonal or slanted/skewed) 314 is provided on an upper or outer portion of the display element 310 to provide a horizontal display surface 315 (outer, upper display surface of display element or device 310).

During operation, a media server (or media input source) 330 inputs interdigitated (or interlaced) digital content 336 to the display element, which responds by outputting light through the lenticules of the sheet 314 to provide a 3D image stream or content (e.g., left and right eye images) 320. A viewer 304 then may position themselves with their head (and eyes) above or over (e.g., to one side or leaning over the tabletop surface 315) at a viewing location a viewing distance, DViewing, and angle relative to the display surface 315. The viewer 304 receives the content 320 from the display element 310 and perceives, without the need for 3D glasses or headgear, a 3D object 325 that appears to be standing on or supported by the tabletop display surface 315. The media server 330 includes an interdigitation or interlacing module 334 such that it can receive 3D content (as shown at 338) and generate the interdigitated content 336, which the display element 310 is configured to display via lenticular sheet 314.

The 3D display system 300 also includes a display controller 340, which may take the form of a computing device specially configured (with hardware, firmware, software, and the like) to perform the functions described herein (e.g., to perform the method 200 of FIG. 2). As shown, the controller 340 includes one or more processors 342 (which may include a GPU) that execute code to provide the controller functions and to manage the memory 344 and other controller components (including managing communications (wired or wireless) with other system devices such as media server 330 and location tracker 318, and joystick, hand trackers, keyboard, mouse, or other input devices). The controller 340 includes a scene rendering module 350 that with the virtual camera configuration data 352 acts to render a scene that is stored in memory 344 as shown at 364 (e.g., to perform step 220 of the method 200 of FIG. 2).

The controller 340 also includes a reprojection module 360 that is configured to generate reprojected or remapped content 370 from the rendered scene 354, which can be provided at 338 to the media server 330 for interdigitation and delivery at 336 to the horizontal display element 310. The reprojection module 360 may include or use a GPU fragment shader 362 to perform all or portions of this reprojection, and the module 360 is configured to perform step 230 of the method 200 of FIG. 2. The system 300 includes a location tracker 318 (such as Kinect™ from Microsoft Corporation, a Vicon motion capture system from Vicon Motion Systems Ltd, or other devices and software from these or other distributors/manufacturers) that functions to track the location of the viewer 304 and particularly to track the location of the viewer's head (and even, in some embodiments, to track the eye locations 306 of the viewer 304), and the tracked location data 319 is passed to display controller 340 for storage of 319 in memory 344 and use by the reprojection module 360 in projecting through current viewer eye locations 306.

Further, the module 360 (or other controller software) may act to generate additional eye locations 308 to be provided in the data 319 for use by the reprojection module 360. This may involve determining or estimating viewer eye locations 306 and then calculating one to three or more eye locations adjacent to and proximate to the eye locations 306 (e.g., one location 308 between the two eye locations 306 and one location 308 to the outside of the left and right eye locations 306). As input data, the reprojection module 360 uses the rendered scene 354 and also the fixed camera viewpoints 364 for the display element 310 (e.g., see set of view zones 120 in FIG. 1) to perform the reprojection and/or remapping of content/rendered scene, on a pixel-by-pixel basis, and generate the reprojected/remapped content 370 (e.g., to perform step 230 of method 200 of FIG. 2). The system 300 is operated periodically (e.g., 30 to 60 frames per second (fps) or the like) to generate and transmit the reprojected/remapped content 338 to the media server 330 for interdigitation and refreshing, with content 336, the horizontal display element 310.

With a general understanding of a tracked automultiscopic 3D tabletop display in mind, it may be useful to describe one particular prototype of an 3D tabletop display designed, fabricated, and operated (controlled as described above with reference to FIGS. 1-3) by the inventors. In the prototype, the 3D tabletop display was based on a 42-inch autostereo display (distributed by Alioscopy) that was placed horizontally on a support platform, e.g., with the horizontal, upper (and lenticular) display surface about 24 inches above the floor. Viewer tracking (or viewer location) data was collected using a Kinect 2.0 and Kinect SDK (distributed by Microsoft Corporation) running on an HP Z800 workstation (available from Hewlett-Packard Company) with automatic detection and without the need for the viewer to wear markers.

The tracked head position from the Kinect skeleton data was transferred via OSC over an Ethernet connection to a 15-inch Mac Book Pro (available from Apple Inc.). Multiple eye viewpoint images (e.g., with 360×720 pixel resolution) around the tracked head position were rendered using parallel axis asymmetric frustums implemented in OpenGL (Open Graphics Library). Multiple eye viewpoints to eight display view reprojection (e.g., with 2880×720 pixel resolution) was calculated using a GLSL (OpenGL Shading Language) fragment shader. An interdigitated image (e.g., with 1920×1080 pixel resolution) was computed from the eight display views using a GLSL fragment shader based on Alioscopy's proprietary fragment shader.

In the prototype, a simple game application with a dozen 3D models, game mechanics, artificial intelligence (AI), and joystick input was written in Javascript. The game play and display updated at 60 fps, while the tracking of location occurred at 30 fps. During control/operations, 3D images with a depth of +/−4 inches above and below the display surface were presented or generated, with objects placed on a virtual floor 4 inches below the tabletop surface to maximize the use of the viewing volume. 3D images were viewable from directly above the display surface to several feet away, from varying heights (e.g., from 3 feet above the display surface to over 4 feet above the display surface), and within a 120-degree field-of-view (fov) left-to-right.

Because tracking of viewer location was used by the controller, parallax (in the viewed 3D object or 3D image stream) appeared continuous rather than the 3D object being made up of eight discrete views. The use of more than two eye views (e.g., 4 or more total) removed remapping gaps that may be caused by calibration or tracking inaccuracies and may be used to increase the effective view zone width, and this technique may also have reduced the effects of tracking and rendering latency. If a viewer's location (viewing location) is properly tracked, 3D images were created that were also properly viewable by the viewer from the opposite side of the 3D tabletop display (opposite side from the viewer's present location) as well as along the left and right sides of the display surface (e.g., due to the use of a slanted lenticular sheet).

Based on this prototype work, it is believed that multiple stereo-pairs can be reprojected into the eight display viewpoints, which will allow for multiple viewers to perceive their own perspectively correct 3D imagery. However, the more viewers there are, the more restricted the eye viewpoints should be to prevent overlapping view information. This is especially true considering that the nominal view zone is only 13.3 degrees (in some embodiments) and outside of this area view zones are repeated. Physically separated eyepoints may occupy the same display viewpoint because of repeated view zones.

Figure 4:
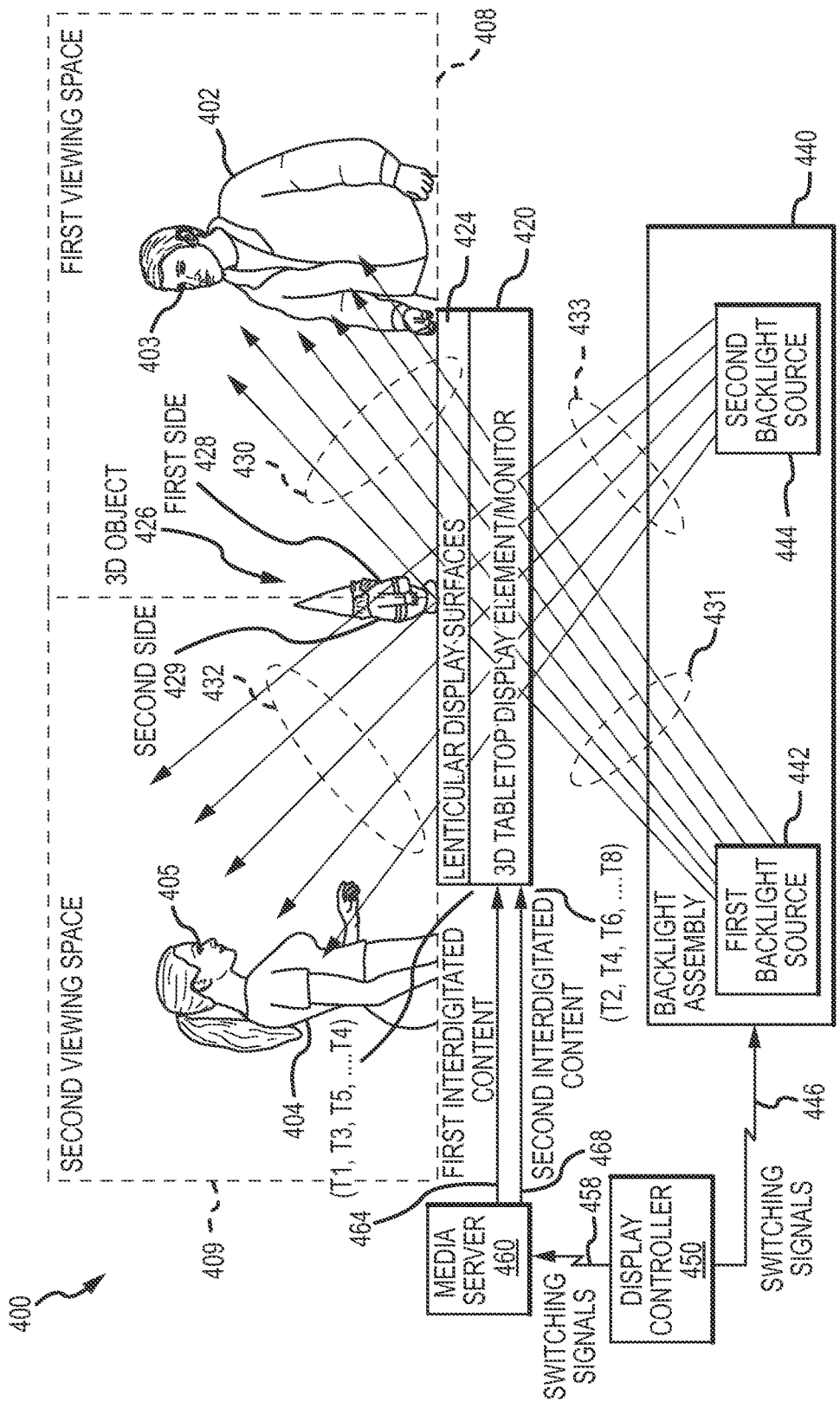
FIG. 4 is a functional block or schematic side view of a 3D display system adapted for concurrent use by two users or viewers on opposite sides of the tabletop display.

It may be desirable for a 3D tabletop display to be used to display 3D objects or images correctly to two viewers or users at the same time. For example, a pair of viewers may be playing a 3D game or acting together to inspect a displayed 3D model, and the two viewers may stand on opposite sides of the tabletop surface facing each other. As one solution to this concurrent-use issue, FIG. 4 provides a functional block or schematic side view of a 3D display system 400 adapted for concurrent use by two users or viewers on opposite sides of a lenticular display surface (or horizontal tabletop surface) 424 on a 3D tabletop display element or monitor 420. As shown, a first viewer (or user) 402 is positioned in a first viewing space 408 above and to a first side of the lenticular display surface 424 while a second viewer 404 is positioned in a second viewing space 409 above and to a second side of the surface 424. This positions the two viewers 402, 404 on opposite sides of the display element 420.

The viewers' eyes (or eye locations) 403, 405 are determined and tracked for use in generating (by display controller 450) first interdigitated content 464 and second interdigitated content 468, respectively, of a 3D scene as discussed above for serving by media server 460. The first interdigitated content 464 is displayed in the display element 420 at a first set of times (e.g., $T_1, T_3, T_5 \ldots T_Y$) while the second interdigitated content 468 is displayed in the display element 420 in a second set of times that alternate with (or are with time multiplexed) with the first set of times (e.g., $T_2, T_4, T_6 \ldots T_Z$). This results in a 3D object (or 3D scene) 426 being displayed to the two viewers 402, 404 in the two viewing spaces 408, 409, with the first viewer 402 viewing a first side 428 of the 3D object 426 and the second viewer 404 viewing a second side 429 of the 3D object 426 (e.g., the 3D scene is rendered for viewing from the two differing viewing distances and locations relative to the display surface 424 (and 3D scene/object 426)).

To this end, the display controller 450 provides switching (or sync) signals 458 to the media server (content source) 460 to provide the content 464, 468 in a switched or time multiplexed manner. Likewise, the display controller 450 provides switching (or sync) signals 446 to a backlight assembly 440 for the 3D tabletop display element 420 to provide, in a time alternating or switching manner, first backlight 431 and second backlight 433 so as to direct display/image light 430, 432, respectively through the display element 420 and lenticules of surface 424 to the eyes 403, 405 of the first and second viewers 402, 404. The first backlight source 442 may be adapted to provide light 431 at an angle (or other manner) such that the first interdigitated content 464 is only visible to viewers in space 408 (or at least not in space 409). In contrast, the second backlight source 444 is adapted to provide light 433 at an angle (or other manner) such that the second interdigitated content 468 is only visible to viewers in space 409 (or at least not in space 408).

The operation of the first backlight source 442 is time synchronized with the delivery of the first interdigitated content 464 to the display element 420, and the operation of the second backlight source 444 is time synchronized with the delivery of the second interdigitated content 468 to the display element 420. The refresh rates may be 30 to 60 fps such that each viewer 402, 404 does not sense any gap in their viewing of the 3D object 426 such that to the viewers 402, 404 the first and second interdigitated content 464, 468 is provided concurrently and continuously (e.g., both viewers 402, 404 believe they are concurrently viewing the 3D object or scene 426).

Figure 5:
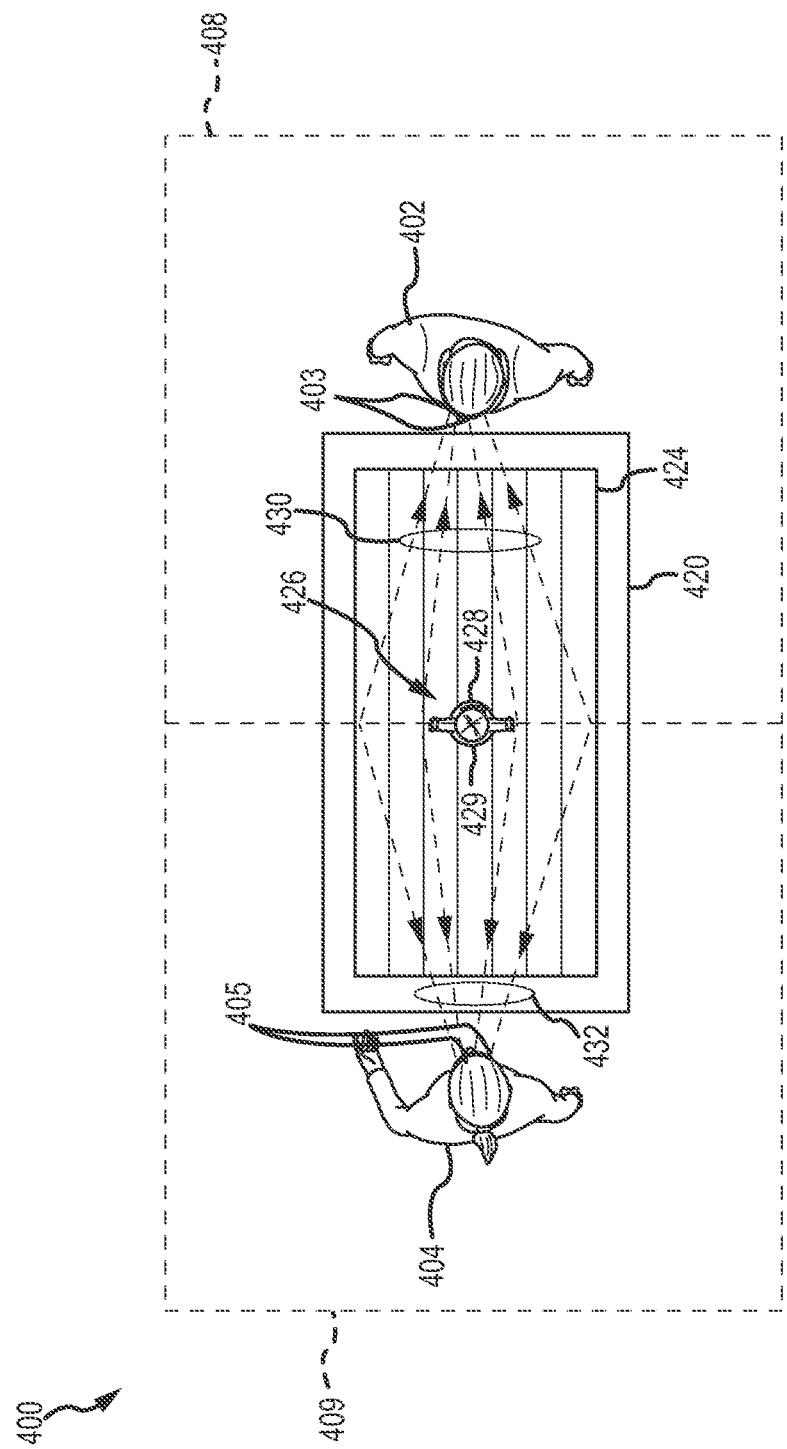
FIG. 5 is top view of the 3D display system of FIG. 4.

FIG. 5 illustrates the operating display system 400 with a top view, which is useful for further showing the relative locations of the viewing spaces 408, 409 and the viewers 402, 404 relative to the lenticular display surface 424 on the horizontally arranged or tabletop display element 420. FIG. 5 also illustrates that the viewers 402, 404 generally are positioned to view the lenticular surface 424 of the display element 420 to experience horizontal parallax (e.g., to generally view the surface 424 along the longitudinal axes of the lenticules).

As shown with the 3D display system 400 of FIGS. 4 and 5, the display can be configured to handle two users on opposite sides of the tabletop (face-to-face) each seeing their own wide-angle 3D view with a wide freedom of movement. To accomplish this display, a switched and directional backlight can be used with the lenticular display and the tracked view reprojection algorithm (or display control techniques taught herein). At one moment in time, the tracked reprojected views of the first viewer is calculated and presented on the display with the directional backlight illuminated such that only the first viewer can see the 3D image, while no (or little) light is directed towards the second viewer in the second viewing space (who, as a result, sees nothing). During the next moment in time (or next display time period), the other viewer's tracked reprojected view is calculated and presented on the lenticular display with the directional backlight illuminated so the second viewer can see the 3D image but not the first viewer (as no (or little) light is directed towards the first viewer).

The switching of the viewpoints and illumination can occur very rapidly (e.g., 120 times per second) so that the 3D images are flicker-free and have smooth motion. In this way, each person or viewer sees a perspectively correct 3D image from their own viewpoint on opposite sides of the tabletop display. The directional light sources may be provided in a variety of ways including use of an LCD or the like for the display element and providing light sources that provide lighting at angles (or directional light as shown in FIG. 4) through the display element into the two viewing space. This may be thought of as a physical solution to providing directional light, but such angled or directional light can be provided by simulating such a physical arrangement of two light sources such as with a lens solution, with use of collimated light, with a lenticular solution that may include structured light, and with the use of one or more mirrors (which may be parabolic in shape) or prismatic films including edge-lit directional optical films (e.g., Vikuiti 3D display film available from 3M or the like).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The inventors have created a large autostereoscopic tabletop display using a lenticular display with unique control over its displayed content, which may be thought of as "tracked or multiscopic viewpoint reprojection." Compared to other autostereo tabletops, the inventors teach a large full color display surface with relatively high resolution and full 60. Hz update rate (with the prototype discussed above being adapted for use by one viewer). Multiscopic viewpoint reprojection was developed, in part, to overcome the lenticular display's inherent limitations of horizontal parallax only views, small fields of view, and pseudoscopic and repeated view zones. Although there are eight fixed display views (in some of the non-limiting example displays described), viewer tracking and view reprojection provides smooth parallax over a wide field of view, with the possible benefit of reducing the effects of tracking and rendering latency.

Free stereo viewpoint to fixed viewpoint remapping is generally applicable to all lenticular displays and is largely independent of the interdigitation process, which may vary depending upon the layout and orientation of the lenticular sheet on the display. Because the display has no moving parts nor complicated and/or expensive components, the display is scalable, e.g., 55-inch diagonal and 4K resolution (720 pixels after interdigitation) lenticular autostereo displays are already commercially available and could readily be modified (e.g., by the control techniques taught herein) for use as a tracked autostereoscopic 3D tabletop display.

We claim:

1. An apparatus for displaying three dimensional (3D) images to a viewer, comprising:
    a display element with a lenticular display surface, wherein the lenticular display surface is horizontal and facing upward into a viewing space;
    a location tracking element tracking a location of a viewer in the viewing space relative to the lenticular display surface;
    a display controller generating reprojected content for use in operating the display element to display 3D images to the viewer via the lenticular display surface, wherein the reprojected content is generated from a digital 3D scene and is based on a set of eye locations determined based on the location of the viewer in the viewing space;
    a second location tracking element tracking a location of a second viewer in a second viewing space on a side of the lenticular display surface opposite the viewing space; and
    a backlight assembly operating to provide first and second backlighting to the display element in a time multiplexed manner, wherein the first backlighting is projected through the lenticular display surface to the viewing space and the second backlight is projected through the lenticular display surface to the second viewing space,
    wherein the display controller generates second reprojected content for use in operating the display element to display 3D images to the second viewer via the lenticular display surface,
    wherein the second reprojected content is generated from the digital 3D scene and is based on a set of eye locations determined based on the location of the second viewer in the second viewing space, and
    wherein the backlight assembly comprises directional lighting selectively providing the first and second backlighting through the lenticular display surface with angular offsets of at least 30 degrees.

2. The apparatus of claim 1, further comprising an interdigitation module processing the reprojected content to generate interdigitated content for the lenticular display surface used in the operating of the display element to display the 3D images to the viewer.

3. The apparatus of claim 1, wherein the set of eye locations comprises at least two eye locations including a left eye location and a right eye location associated with positions of eyes of the viewer in the viewing space.

4. The apparatus of claim 1, wherein the reprojected content is generated by determining for each pixel of the display element content passing through the eye locations and remapping content delivered to each of the pixels of the display element to achieve a predefined pattern of content in viewpoints of a nominal view zone of the display element.

5. The apparatus of claim 4, wherein the remapping comprises reprojecting content between viewpoints of the nominal view zone and the pixels of the display element through each of the eye locations.

6. The apparatus of claim 4, wherein the nominal view zone is at a distance in the range of 9 to 13 feet from the lenticular display surface and the eye locations are at a viewing distance less than the distance of the nominal view zone.

7. The apparatus of claim 1, wherein the display controller performs the generating on a periodic basis with a period of at least 60 times per second.

8. The apparatus of claim 1, wherein the reprojected content is used to operate the display element only when the first backlighting is projected through the lenticular display surface and the second reprojected content is used to operate the display element only when the second backlighting is projected through the lenticular display surface.

9. An autostereoscopic display, comprising:
a display element projecting autostereoscopic images from a display surface;
a tracking mechanism tracking locations of a viewer relative to the display surface; and
a controller generating reprojected content for use in operating the display element to display the autostereoscopic images to the viewer via the display surface,
wherein the reprojected content is generated based on the tracked locations of the viewer, and
wherein the reprojected content is generated by determining for each pixel of the display element content passing through eye locations determined for the each of the tracked locations of the viewer and remapping content delivered to each of the pixels of the display element to achieve a predefined pattern of content in viewpoints for a predefined set of fixed camera locations for the display element,
wherein the display surface includes an array of lenticules and the display surface is supported in a horizontal, upward-facing position,
wherein the display further comprises:
a second tracking mechanism tracking a location of a second viewer positioned in a space on a side of the display surface opposite from a position of the viewer; and
a backlight assembly operating to provide first and second directional backlighting to the display element in a time multiplexed manner, wherein the first backlighting is projected through the display surface to the viewer and the second backlight is projected through the lenticular display surface to the second viewer,
wherein the controller generates second reprojected content for use in operating the display element to display second autostereoscopic images to the second viewer via the display surface when the second backlighting is provided to the display element,
wherein the second reprojected content is generated based on a set of eye locations determined based on the location of the second viewer, and
wherein the backlight assembly comprises directional lighting selectively providing the first and second backlighting through the lenticular display surface with angular offsets of at least 30 degrees.

10. The display of claim 9, wherein the eye locations comprises at least two of the eye locations including a left eye location and a right eye location associated with positions of eyes of the viewer.

11. The display of claim 9, wherein the remapping comprises reprojecting content between viewpoints of the fixed camera locations and the pixels of the display element through each of the eye locations.

12. The display of claim 9, wherein the fixed camera locations are each at a distance in the range of 9 to 13 feet from the display surface and the eye locations are at a viewing distance less than the distance of the fixed camera locations and wherein the controller performs the generating on a periodic basis with a period of at least 60 times per second.

13. A method for providing a 3D experience without 3D glasses, comprising:
tracking a location of a viewer relative to a lenticular display surface of a display element;
determining a set of eye locations for the viewer based on the tracked location;
rendering a virtual 3D scene;
reprojecting viewpoints of the display element based on each of the eye locations;
generating display content by interdigitating the rendered virtual 3D scene based on the reprojected viewpoints;
operating the display element using the display content to provide a 3D object in a space above the lenticular display surface;
repeating the tracking, the determining, the reprojecting, the generating, and the operating for a second viewer positioned on along a side of the lenticular display surface opposite the viewer; and
operating a backlight assembly to provide directional backlighting through display element to alternate between providing the 3D object to the viewer and the second viewer, wherein the backlight assembly comprises directional lighting selectively providing the first and second backlighting through the lenticular display surface with angular offsets of at least 30 degrees.

14. The method of claim 13, wherein the reprojecting comprises determining, for each pixel of the lenticular display surface, viewpoints for each of the eye locations.

15. The method of claim 13, wherein the set of eye locations includes at least four eye locations determined based on the tracked location of the viewer.

16. The method of claim 13, wherein the lenticular display surface is supported in a horizontal, upward-facing position.

17. The method of claim 13, wherein the lenticular display surface is supported in a vertical or portrait-mode position.

18. An apparatus for displaying three dimensional (3D) images to a viewer, comprising:
a display element with a lenticular display surface, wherein the lenticular display surface is horizontal and facing upward into a viewing space;
a location tracking element tracking a location of a viewer in the viewing space relative to the lenticular display surface;
a display controller generating reprojected content for use in operating the display element to display 3D images to the viewer via the lenticular display surface, wherein the reprojected content is generated from a digital 3D scene and is based on a set of eye locations determined based on the location of the viewer in the viewing space;
a second location tracking element tracking a location of a second viewer in a second viewing space on a side of the lenticular display surface opposite the viewing space; and
a backlight assembly operating to provide first and second backlighting to the display element in a time multiplexed manner, wherein the first backlighting is projected through the lenticular display surface to the viewing space and the second backlight is projected through the lenticular display surface to the second viewing space, wherein the display controller generates second reprojected content for use in operating the display element to display 3D images to the second viewer via the lenticular display surface, wherein the second reprojected content is generated from the digital 3D scene and is based on a set of eye locations determined based on the location of the second viewer in the second viewing space, and wherein the reprojected content is used to operate the display element only when the first backlighting is projected through the lenticular display surface and the second reprojected content is used to operate the display element only when the second backlighting is projected through the lenticular display surface.

19. The apparatus of claim 18, further comprising an interdigitation module processing the reprojected content to generate interdigitated content for the lenticular display surface used in the operating of the display element to display the 3D images to the viewer.

20. The apparatus of claim 18, wherein the set of eye locations comprises at least two eye locations including a left eye location and a right eye location associated with positions of eyes of the viewer in the viewing space.

21. The apparatus of claim 18, wherein the reprojected content is generated by determining for each pixel of the display element content passing through the eye locations and remapping content delivered to each of the pixels of the display element to achieve a predefined pattern of content in viewpoints of a nominal view zone of the display element.

22. The apparatus of claim 21, wherein the remapping comprises reprojecting content between viewpoints of the nominal view zone and the pixels of the display element through each of the eye locations.

23. The apparatus of claim 21, wherein the nominal view zone is at a distance in the range of 9 to 13 feet from the lenticular display surface and the eye locations are at a viewing distance less than the distance of the nominal view zone.

24. The apparatus of claim 18, wherein the display controller performs the generating on a periodic basis with a period of at least 60 times per second.

* * * * *